United States Patent
Garcia et al.

(10) Patent No.: US 9,027,185 B2
(45) Date of Patent: May 12, 2015

(54) PORTABLE HEAD SUPPORT DEVICE

(71) Applicants: Joseph L Garcia, Buena Vista, NM (US); Lori Garcia, Buena Vista, NM (US)

(72) Inventors: Joseph L Garcia, Buena Vista, NM (US); Lori Garcia, Buena Vista, NM (US)

( * ) Notice: Subject to any disclaimer, the term of this patent is extended or adjusted under 35 U.S.C. 154(b) by 0 days.

(21) Appl. No.: 14/282,930

(22) Filed: May 20, 2014

(65) Prior Publication Data

US 2015/0020314 A1    Jan. 22, 2015

Related U.S. Application Data

(60) Provisional application No. 61/847,306, filed on Jul. 17, 2013, provisional application No. 61/874,236, filed on Sep. 5, 2013.

(51) Int. Cl.
*A47C 7/38* (2006.01)
*B60N 2/48* (2006.01)

(52) U.S. Cl.
CPC .............. *A47C 7/383* (2013.01); *B60N 2/4879* (2013.01)

(58) Field of Classification Search
CPC ..... A47C 7/383; B60N 2/4879; B60N 2/2881
USPC ........... 5/652, 657, 632, 636, 655.9; 248/118; 297/392, 393, 397, 482
See application file for complete search history.

(56) References Cited

U.S. PATENT DOCUMENTS

| | | | | |
|---|---|---|---|---|
| 2,172,178 A | * | 9/1939 | Rosenberg | 248/118 |
| 2,295,906 A | * | 9/1942 | Lacour | 5/636 |
| D204,443 S | * | 4/1966 | Wood | D6/601 |
| 3,496,928 A | * | 2/1970 | LoPiccolo | 5/655 |
| 3,957,282 A | * | 5/1976 | Finnigan | 297/482 |
| 4,057,181 A | * | 11/1977 | Finnigan | 224/280 |
| 4,091,481 A | * | 5/1978 | Redman | 5/639 |
| 4,560,201 A | | 12/1985 | Scott | |
| 4,565,408 A | | 1/1986 | Palley | |
| 4,678,205 A | * | 7/1987 | Wold | 280/808 |
| 4,738,488 A | * | 4/1988 | Camelio | 297/383 |
| 4,829,613 A | * | 5/1989 | Yon | 5/652 |
| D308,787 S | * | 6/1990 | Youngblood | D6/601 |
| 4,953,816 A | * | 9/1990 | Wilkinson | 248/102 |
| 5,005,866 A | * | 4/1991 | Reedom | 280/801.1 |
| 5,108,152 A | * | 4/1992 | Reilly et al. | 297/482 |
| 5,114,185 A | * | 5/1992 | Reedom | 280/801.1 |
| 5,580,133 A | * | 12/1996 | Knox et al. | 297/464 |
| 5,611,601 A | | 3/1997 | Cowgur | |
| 5,645,319 A | | 7/1997 | Parks | |
| 6,017,094 A | * | 1/2000 | Syiek | 297/482 |
| 6,135,560 A | | 10/2000 | Fagg | |
| 6,266,832 B1 | * | 7/2001 | Ezell | 5/640 |
| 6,349,437 B1 | * | 2/2002 | Horning | 5/632 |
| 6,394,554 B1 | | 5/2002 | Hingle | |
| 6,554,363 B1 | * | 4/2003 | Silva | 297/397 |

(Continued)

*Primary Examiner* — Nicholas Polito
*Assistant Examiner* — Eric Kurilla
(74) *Attorney, Agent, or Firm* — Gina Tassotti Constant

(57) ABSTRACT

The portable head support device of the present invention provides comfortable support for a user's head while the user is in a sitting potion. The pillow or cushion has a v-shape on the top where a user's chin can rest so that the head cannot fall forward or sideways but will stay in a comfortable and upright position. The pillow is held in place by hook and loop fasteners located on the pillow and, for instance, on straps extending from behind the user's back and over the shoulders or wrap-around supports wrapped around standard seat belts. The head support can be used in child car seats to keep a child's head in a safe and stable position while they sleep.

2 Claims, 11 Drawing Sheets

(56) References Cited

U.S. PATENT DOCUMENTS

| | | | |
|---|---|---|---|
| 6,557,895 B2 * | 5/2003 | Haack et al. | 280/801.1 |
| 6,576,808 B1 * | 6/2003 | Dreyer | 602/42 |
| 6,625,829 B2 | 9/2003 | Zell | |
| 6,860,563 B1 | 3/2005 | Semsch | |
| 6,863,350 B1 * | 3/2005 | McCulley et al. | 297/465 |
| 6,973,691 B1 | 12/2005 | Cordova | |
| 7,086,703 B1 * | 8/2006 | Jones | 297/488 |
| 7,093,903 B2 * | 8/2006 | O'Connor et al. | 297/397 |
| 7,165,279 B1 * | 1/2007 | Georgescu | 5/636 |
| 7,350,862 B2 * | 4/2008 | Fransen et al. | 297/250.1 |
| 7,512,993 B1 * | 4/2009 | Gutierrez | 2/49.1 |
| 8,783,776 B1 * | 7/2014 | Perkins | 297/392 |
| 2002/0043859 A1 * | 4/2002 | Smith | 297/392 |
| 2003/0038520 A1 * | 2/2003 | Marbutt | 297/392 |
| 2003/0052528 A1 * | 3/2003 | Huggins | 297/482 |
| 2003/0127899 A1 * | 7/2003 | Smith | 297/397 |
| 2003/0217412 A1 * | 11/2003 | Johns et al. | 5/636 |
| 2003/0227214 A1 * | 12/2003 | Liang | 297/482 |
| 2004/0026979 A1 * | 2/2004 | Haddon | 297/393 |
| 2005/0121967 A1 * | 6/2005 | Crowl | 297/482 |
| 2005/0273935 A1 * | 12/2005 | Cordova et al. | 5/652 |
| 2006/0244299 A1 * | 11/2006 | Snedeker | 297/393 |
| 2007/0052274 A1 * | 3/2007 | Morphew et al. | 297/392 |
| 2007/0222269 A1 * | 9/2007 | Stoeckel et al. | 297/392 |
| 2009/0013471 A1 * | 1/2009 | Yang | 5/640 |
| 2009/0133193 A1 * | 5/2009 | Weise | 5/640 |
| 2009/0222990 A1 * | 9/2009 | Stubberud | 5/644 |
| 2010/0117435 A1 * | 5/2010 | Samuelsen | 297/464 |
| 2011/0049950 A1 * | 3/2011 | Pereira | 297/219.12 |
| 2011/0156469 A1 * | 6/2011 | Carpenter | 297/482 |
| 2011/0227392 A1 * | 9/2011 | Morrissey | 297/482 |
| 2011/0289687 A1 * | 12/2011 | Rieber | 5/636 |
| 2013/0047342 A1 * | 2/2013 | Schwingendorf et al. | 5/652 |
| 2013/0048800 A1 * | 2/2013 | Garcia et al. | 248/118 |
| 2013/0088063 A1 * | 4/2013 | Montes | 297/393 |
| 2013/0146723 A1 * | 6/2013 | Johnson et al. | 248/118 |
| 2013/0232693 A1 * | 9/2013 | Myers | 5/636 |

* cited by examiner

PORTABLE HEAD SUPPORT DEVICE

CROSS-REFERENCE TO RELATED APPLICATIONS

This application claims priority to and the benefit of the filings of U.S. Provisional Patent Application Ser. No. 61/847,306, entitled "Head Support," filed on Jul. 17, 2013, and U.S. Provisional Patent Application Ser. No. 61/874,236 entitled "Head Support," filed on Sep. 5, 2013, and the specifications thereof are incorporated herein by reference.

FIELD OF THE INVENTION

The field of the present invention is portable head supports, and more particularly, head supports that support a user's head in an upright, ergonomically correct, comfortable position, preventing the user's head from falling forward or sideways while sleeping in an upright or sitting position.

BACKGROUND OF THE INVENTION

Head support devices are widely used by travelers, children in car seats, and other people that have to sleep with their torso in an upright position, such as while sitting. However, most head supports cannot effectively prevent the user's head from tilting forward or sideways, which naturally occurs while sleeping in an upright position, or avoid putting pressure on the carotid arteries, jugular veins, or the trachea. In addition, most known devices are held in place with the aid of a neck strap that puts forward pressure on the user's upper neck region causing discomfort and possibly injuring the vertebrae. In addition, some devices cannot remain in place unless the torso of the user is leaning forward on the device. One particular problem that has not been resolved thus far is that children riding in car seats tend to fall asleep in very uncomfortable positions, e.g. with their head hanging forward, sideways, or lolling to and fro. There are no head supports in the prior art that effectively prevent this problem.

For instance, U.S. Pat. No. 5,611,601 to Cowgur discloses a rest pillow for facilitating rest for a person in a sitting position comprising an inflated flexible substantially rectangular compartment, and a strap secured to the sides of the compartment for securing the compartment to the waist of the person using it.

U.S. Pat. No. 5,645,319 to Parks, Jr., discloses an inflatable pillow on which passengers on commercial carriers may lean forward to rest their head, the pillow substantially occupying the space in front of such passengers.

U.S. Pat. No. 6,394,554 to Hingle discloses a "7"-shaped seat belt pillow which includes a neck-supporting pillow member adapted to be placed behind the head or neck while sitting in a vehicle's seat along with a secondary body pillow which is angled to approximate the angle of a buckled shoulder restraining strap and adapted to be strapped to the seat belt so it can be hugged by the user.

U.S. Pat. No. 6,625,829 to Zell discloses a chin support pillow for supporting a person's head in an upright position while sitting including a flexible member that extends around the back of the person's neck.

U.S. Pat. No. 6,860,563 to Semsch, et al, discloses a device for avoiding or limiting the tilting of the head forwards and/or to the side of a passenger sitting in a seat which has a backrest, having one or more cushion-like elements designed to completely surround the side and front sections of the neck and/or of the head of the passenger and connecting around the back of the backrest or headrest.

U.S. Pat. No. 6,973,691 to Cordova discloses a portable elongated support pillow that is crescent shaped at the top and is propped between the chin and lap of a user. There are sling style pockets to accommodate a user's arms or a strap.

Nothing in the prior art provides the unique benefits afforded by the present invention.

BRIEF SUMMARY OF THE INVENTION

Embodiments of the present invention solve the above-described problems by providing a cushion like device, or pillow, that has a v-shape on the top where a user's chin can rest with the top sides of the cushion extending upward on each side of the user's chin and jaw area to gently hold the user's head in a comfortable and upright position. This cushion can be held in place by hook and loop fasteners such as Velcro® located on the back of the cushion and on, for instance, one or more straps extending over the user's shoulders. Thus, when the cushion is temporarily fastened to the straps, the head support is held in place such that the user's chin rests on the top of the cushion and the user's head can be held in an upright position. The straps can be held in place behind the user's back, for instance they may be attached to an object or connected to each other, so long as they are secure enough to hold the cushion in place once the user rests his or her chin on the cushion.

When the user is a small child, the cushion may be held in place by attaching it to one or more seat belts, such as the two over-the-shoulder straps that are used in most child car seats. In this embodiment, two wraparound supports are wrapped around the seat belts in a way that the cushion can be attached to the wraparound supports so that the child's chin rests comfortably on the cushion. The wraparound supports have a v-shape on the bottom side so that when they are in the closed configuration and strapped around shoulder seat belts, the child seat buckle is easily accessible. Therefore, the head support device of the present invention, particularly when adapted to use in a car seat, is safer than anything in the prior art because the cushion can be easily detached from the shoulder seat belts and the buckle and be opened quickly in order to free a child from his or her car seat in an emergency.

Further, the wraparound supports can be used in other embodiments of the present invention, not just child car seats. The wraparound supports can be wrapped around any strap or belt-like object to secure the head support cushion in a position to support a sleeping person's head.

Another embodiment of the invention is one where the cushion can be thicker on the top than on the bottom. In this embodiment, the top of the cushion can be as thick as 4 inches. The fastening means is always on the thinner, bottom, portion of the cushion. Therefore, the cushion can only be installed one way, with the thick end under the chin of the user. This provides an additional safety feature because it is impossible for the cushion to accidentally press against a user's throat and cause a choking hazard (especially when the user is a child) because of the cushion's thickness.

In the preferred embodiment, the wraparound supports are made of fabric. When in the open configuration, the wraparound supports have an inside, an outside, a top side, and a bottom side. The inside comprised a center portion that is thicker than the side portions and has a surface that is composed of a grip-like fabric. The material that makes the center portion thicker can be a filling of resilient material. The opposing side portions contain opposing hook and loop fastening strips, like Velcro®. The bottom side has an approximately centered upside down v-shape.

The wraparound supports can then be moved to the closed configuration by joining the opposing side portions containing opposing hook and loop fastening strips together around the child's car seat shoulder seat belt. The thickness of the center of the wraparound support, and the fact that the center is covered in a grip-like fabric, prevents the wraparound supports from moving up or down on the seat belts. However, the wraparound supports can intentionally be installed higher or lower on the seat belts depending on the size of the child. Thus, the device of the present invention can be adjusted as the child grows.

Also, there is one strip of a hook and loop type fastener, like Velcro®, on a side portion of the outside of each wraparound support so that when it is in the closed configuration and wrapped around the shoulder seat belts, the strip of hook and loop fastener is facing away from the child. The hook and loop fastening strips of the two wraparound supports line up with the hook and loop fastening strips that are located on the back of the cushion so that the cushion can be temporarily, but securely, attached to the wraparound supports.

While a hook and loop type fastener, such as Velcro®, is the preferred means for detachably fastening the cushion to the wraparound supports or straps and for keeping the wraparound supports in the closed configuration, any type of fastening device can be used, for instance, buttons, zippers, stitching, tape, and the like, can be used as a fastening means in the present invention.

In another embodiment of the present invention, the cushion can be contained in a removable and washable cover. The cushion cover can be installed around the cushion and sealed with a zipper. The cushion cover can then periodically be removed and washed for the purpose of keeping it sanitary.

BRIEF DESCRIPTION OF THE SEVERAL VIEWS OF THE DRAWINGS

FIG. 6 also shows the approximately centered upside down v-shape on the bottom side of the wraparound support.

DETAILED DESCRIPTION OF THE INVENTION

Figure 1:
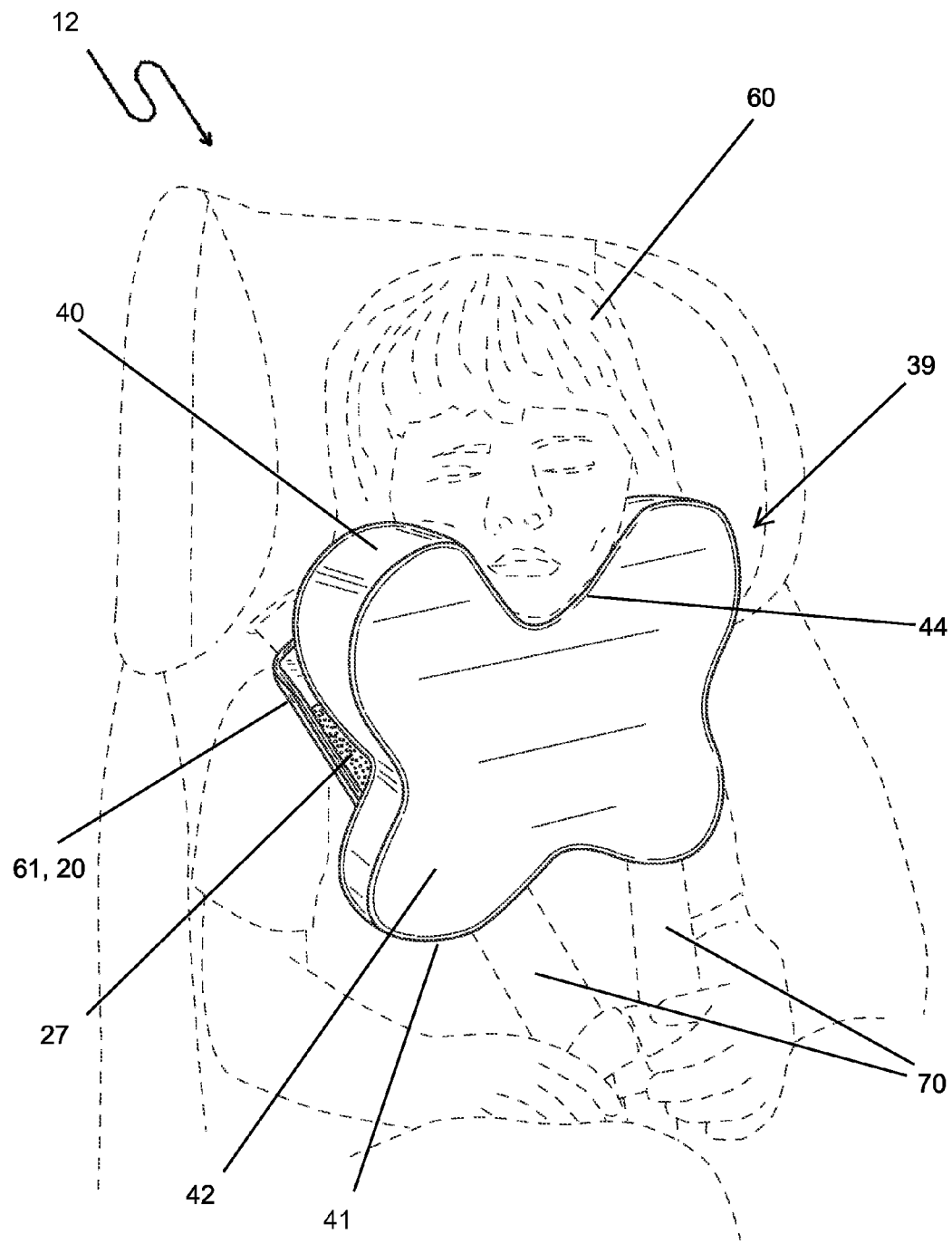
FIG. 1 is a perspective view of the portable head support device comprising the front side of the cushion whose the top portion has a v-shape that can receive the chin of the user, in this case a child in a car seat, and the means for detachably fastening the cushion, which is comprised of two wraparound supports each being wrapped around a car seat shoulder belt.

FIG. 1 shows the portable head support device 12 comprising a cushion 39 having a top portion 40, a bottom portion 41, a front side 42, and a back side 43 (not shown), the top portion 40 having an approximately centered v-shape 44 that can receive the chin of the user 60. The means 61 shown in FIG. 1 for detachably fastening the cushion 39 to at least one support such that the user's 60 chin can rest in the approximately centered v-shape 44 of the top portion 40 of the cushion 39 is comprised of the back side 43 (not shown) of the cushion 39 having at least two strips of one side of a hook and loop fastening device 45 (not shown) and two wraparound supports 20 (only one shown in FIG. 1), each wraparound support 20 being wrapped around a car seat shoulder belt 70 and being detachably fastened to the cushion 39 using a strip of one side of a hook and loop fastening device 27 such that the strip of one side of a hook and loop fastening device 27 is located in a configuration relative to the user 60 that the cushion's 39 at least two strips of one side of a hook and loop fastening device 45 (not shown) can be detachably fastened to the wraparound supports 20 and the user's 60 chin can rest in the approximately centered v-shape 44 of the top portion of the cushion 40.

Figure 2:
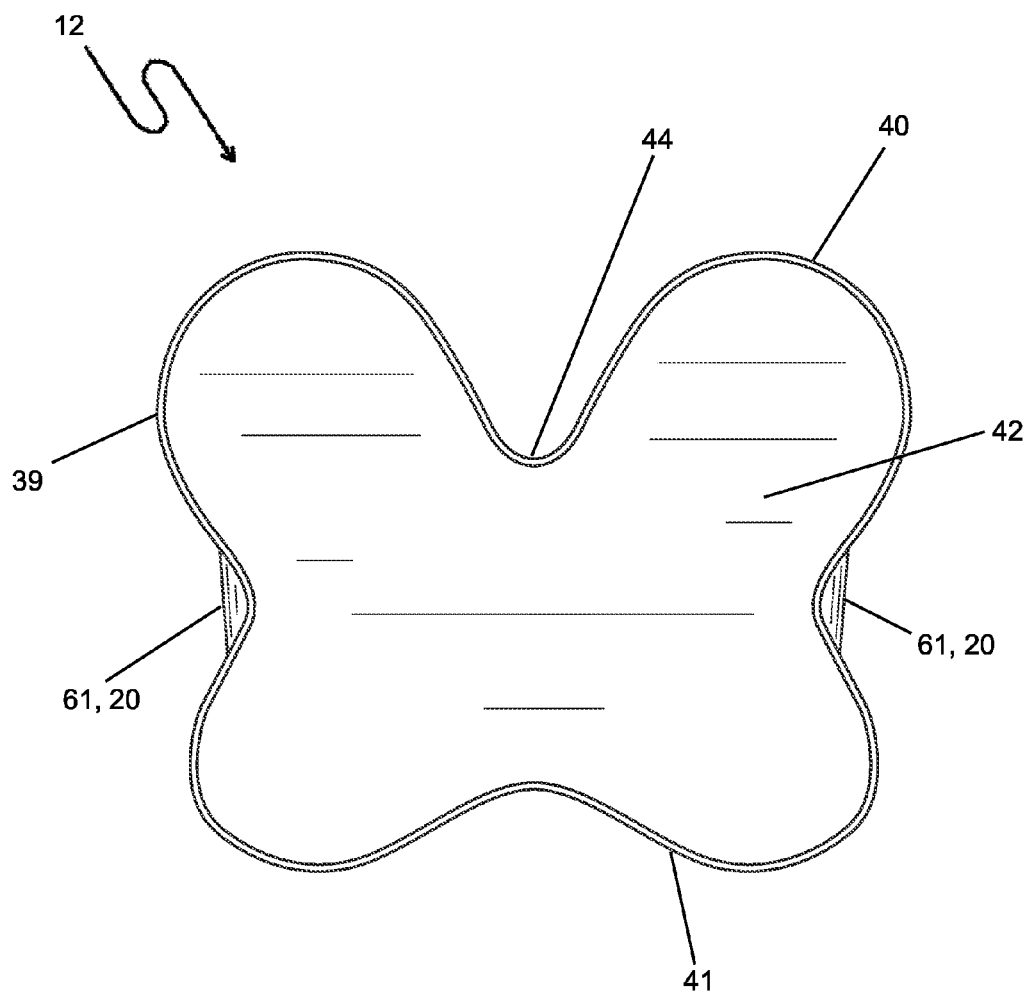
FIG. 2 is a view of the front side of the portable head support device comprising the front side of the cushion, the v-shape on the top side that can receive the chin of a user, and a partial view of the two wraparound supports behind it.

FIG. 2 shows the portable head support device 12 comprising a cushion 39 having a top portion 40, a bottom portion 41, a front side 42 and a back side 43 (not shown), the top portion 40 having an approximately centered v-shape 44 and the means 61 for detachably fastening the cushion 39 to at least one support is comprised of the back side 43 (not shown) of the cushion 39 having at least two strips of one side of a hook and loop fastening device 45 (not shown) and two wraparound supports 20 (partially shown) with a strip of one side of a hook and loop fastening device 27 (not shown) on each wraparound support 20.

Figure 3:
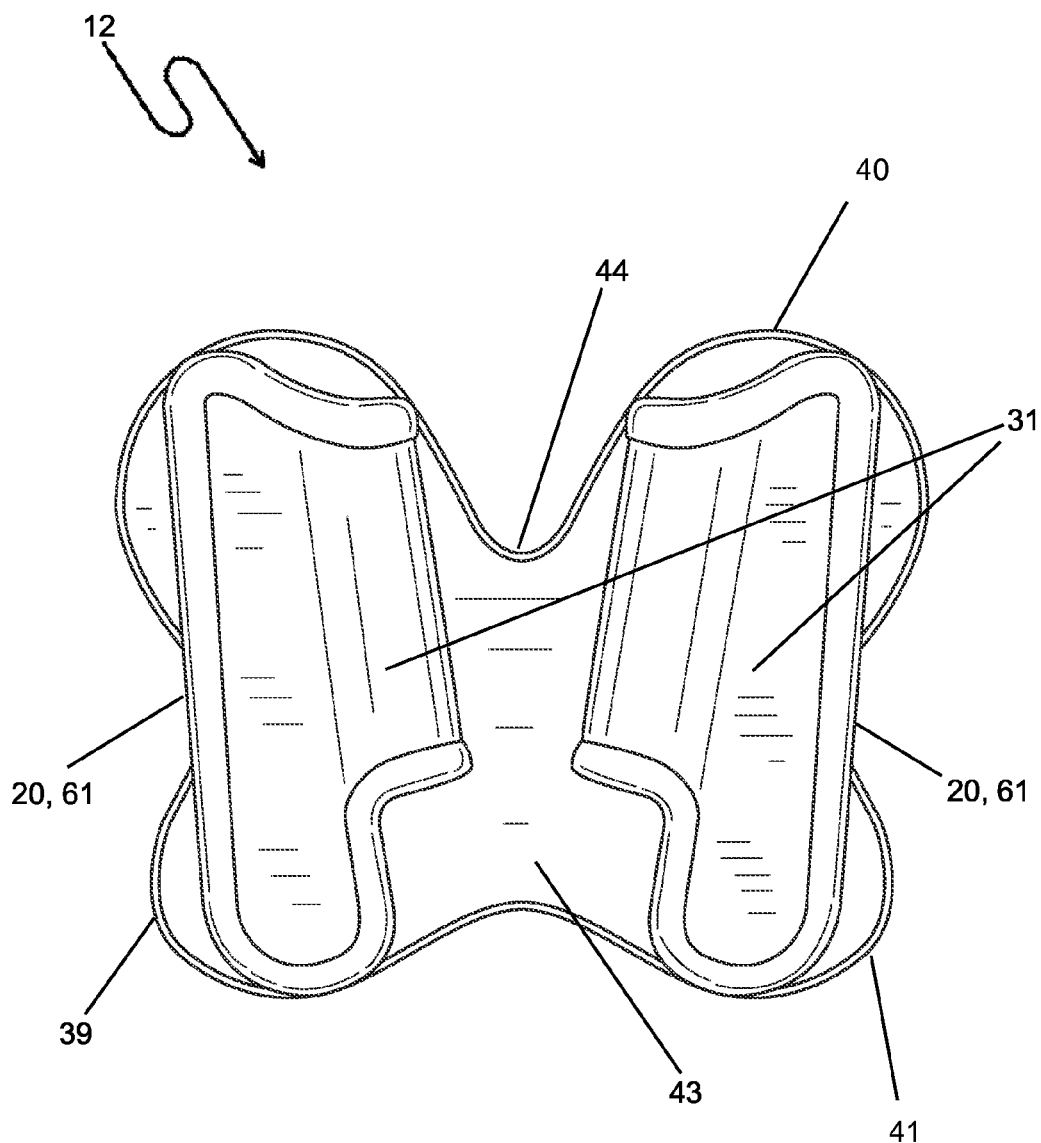
FIG. 3 is a view of the back side of the portable head support device comprising the back side of the cushion, the v-shape on the top side that can receive the chin of a user, and the second back side of the two wraparound supports in the closed configuration.

FIG. 3 shows the portable head support device 12 comprising a cushion 39 having a top portion 40, a bottom portion 41, a front side 42 (not shown) and a back side 43, the top portion 40 having an approximately centered v-shape 44 that can receive the chin of a user 60 (not shown). The at least one means 61 for detachably fastening the cushion 39 to at least one support is comprised of the back side 43 of the cushion 39 having at least two strips of one side of a hook and loop fastening device 45 (not shown) and two wraparound supports 20 in the closed configuration with a strip of one side of a hook and loop fastening device 27 (not shown) on each wraparound support 20.

Figure 4:
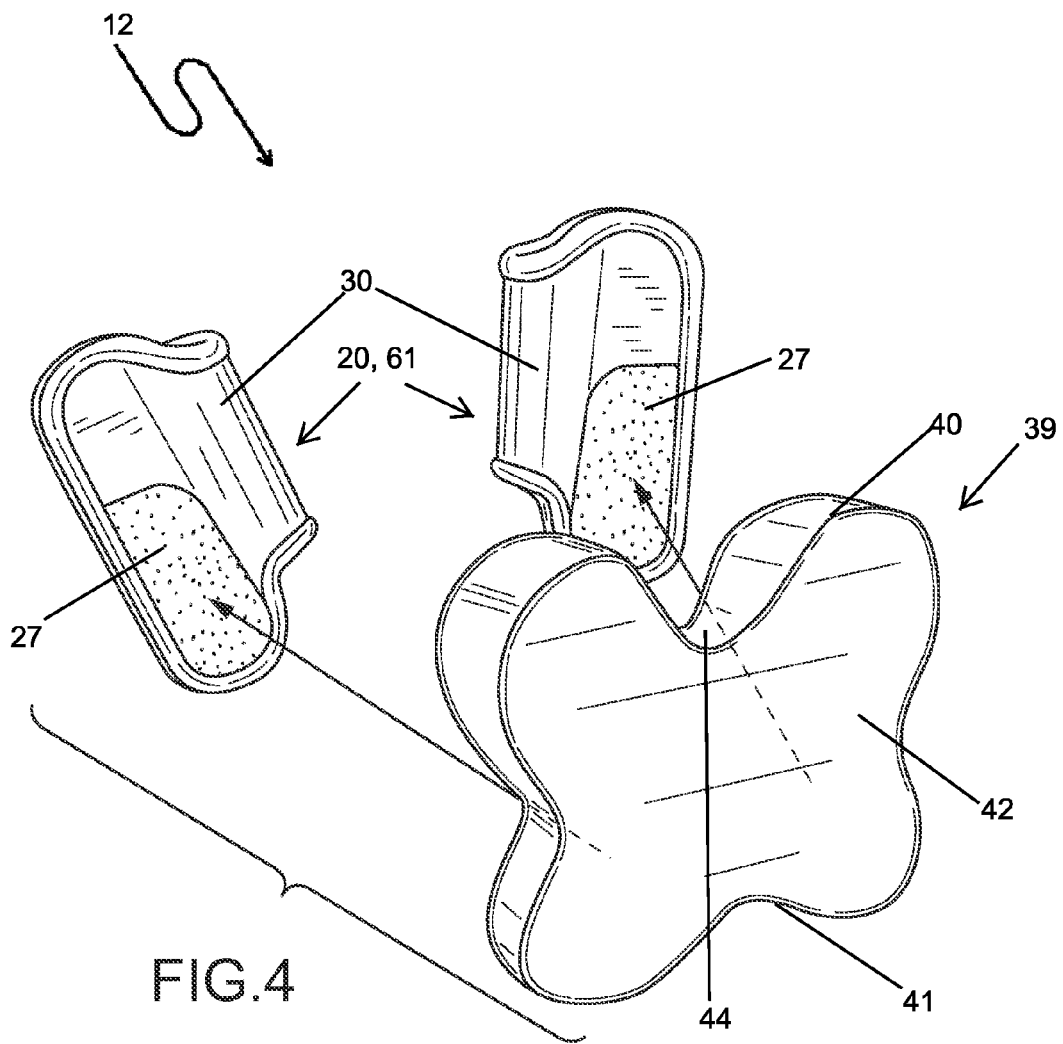
FIG. 4 is a perspective view of the portable head support device comprising the front side of the cushion with a v-shape that can receive the chin of a user and the second front side of the two wraparound supports in the closed configuration with the strip of one side of a hook and loop fastening device on each second front side.

FIG. 4 shows the portable head support device 12 comprising a cushion 39 having a top portion 40, a bottom portion 41, a front side 42, and a back side 43 (not shown), the top portion 40 having an approximately centered v-shape 44 that can receive the chin of a user (not shown). The at least one means 61 for detachably fastening the cushion 39 to at least one support is comprised of the back side 43 (not shown) of the cushion 39 having at least two strips of one side of a hook and loop fastening device 45 (not shown) and two wraparound supports 20 in the closed configuration with the strip of one side of a hook and loop fastening device 27 on each second front side 30 of the closed configuration of the wraparound support 20.

Figure 5:
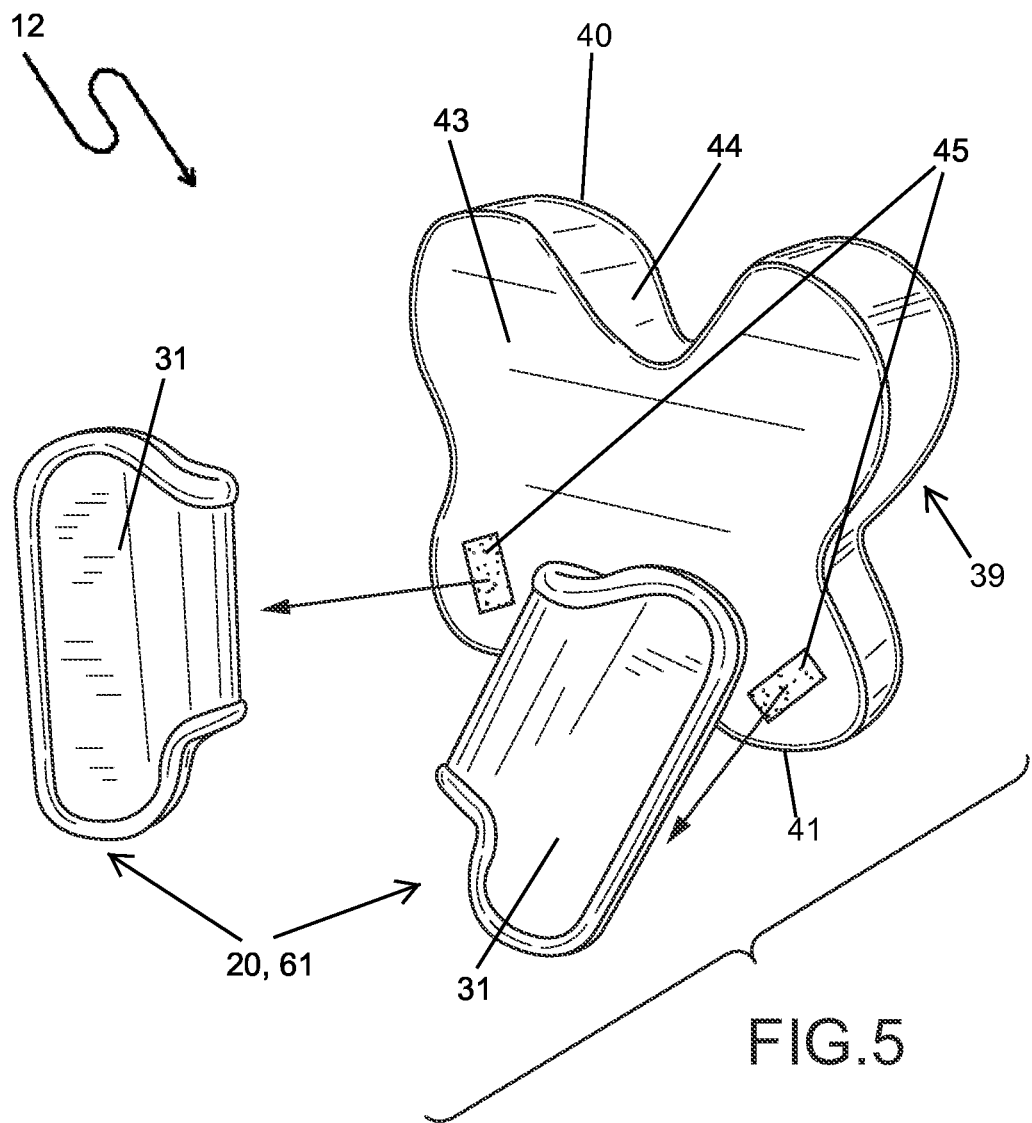
FIG. 5 is a perspective view of the portable head support device comprising the back side of the cushion with a v-shape on top that can receive the chin of a user, the back side having two strips of one side of a hook and loop fastening device. The second back side of the two wraparound supports in the closed configuration can also be seen.

FIG. 5 shows the portable head support device 12 comprising a cushion 39 having a top portion 40, a bottom portion 41, a front side 42 (not shown), and a back side 43, the top portion 40 having an approximately centered v-shape 44 that can receive the chin of a user (not shown). The at least one means 61 for detachably fastening the cushion 39 to at least one support is comprised of the back side 43 of the cushion 39 having at least two strips of one side of a hook and loop fastening device 45 and the two wraparound supports 20 in the closed configuration. Each second back side 31 of the closed configuration of the wraparound supports 20 is shown.

Figure 6:
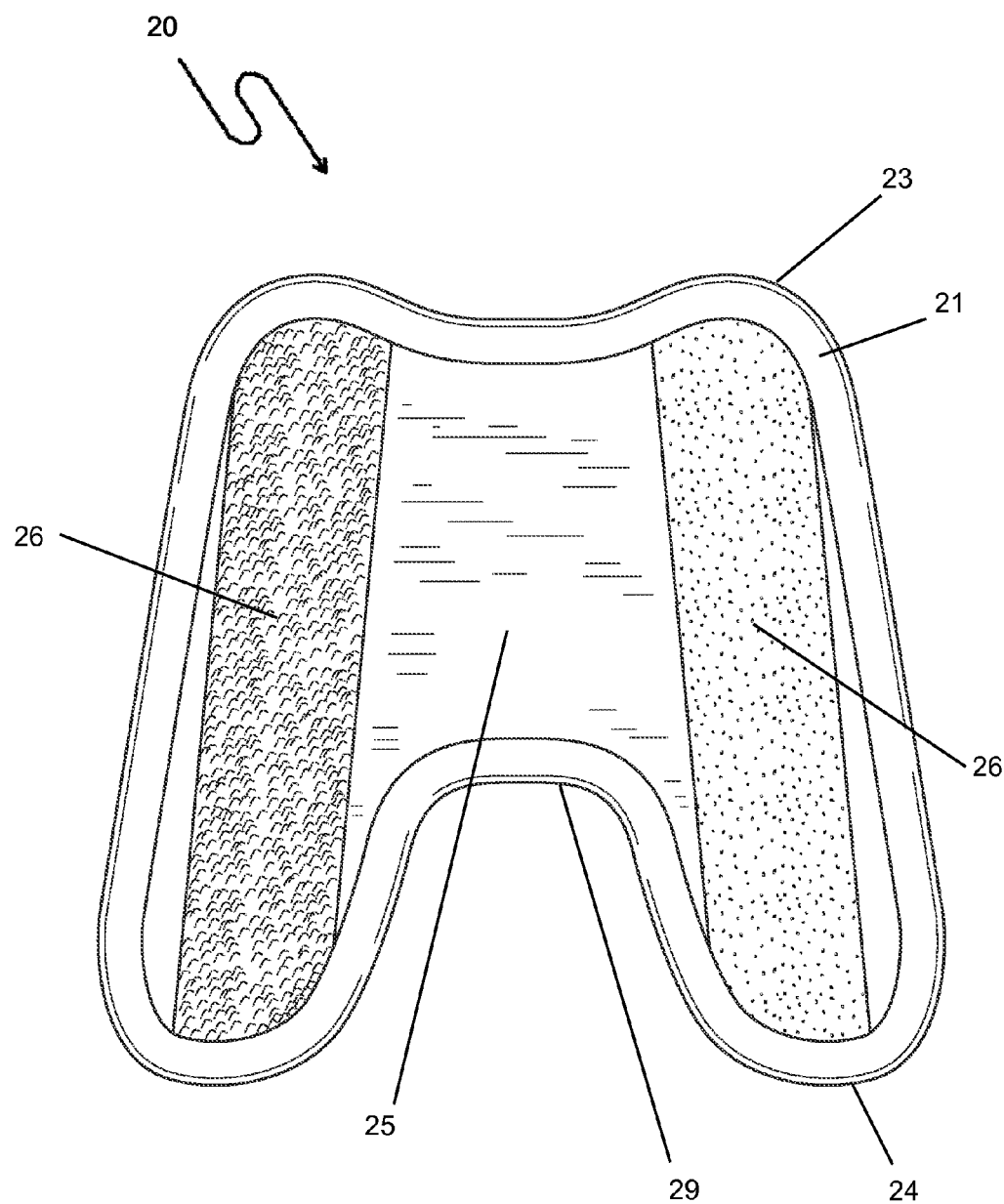
FIG. 6 is a view of the inside of a wraparound support in the open configuration including the center portion and the two opposing side portions containing opposing hook and loop fastening strips.

FIG. 6 shows a wraparound support 20 in the open configuration, the wraparound support 20 comprising an inside 21, an outside 22 (not shown), a top side 23, and a bottom side 24, said inside 21 comprising a center portion 25 and two opposing side portions containing opposing hook and loop fastening strips 26, the center portion 25 being thicker than the side portions 26 and having a surface that is comprised of a grip-like fabric, and said bottom side 24 comprising a second approximately centered upside down v-shape 29.

Figure 7:
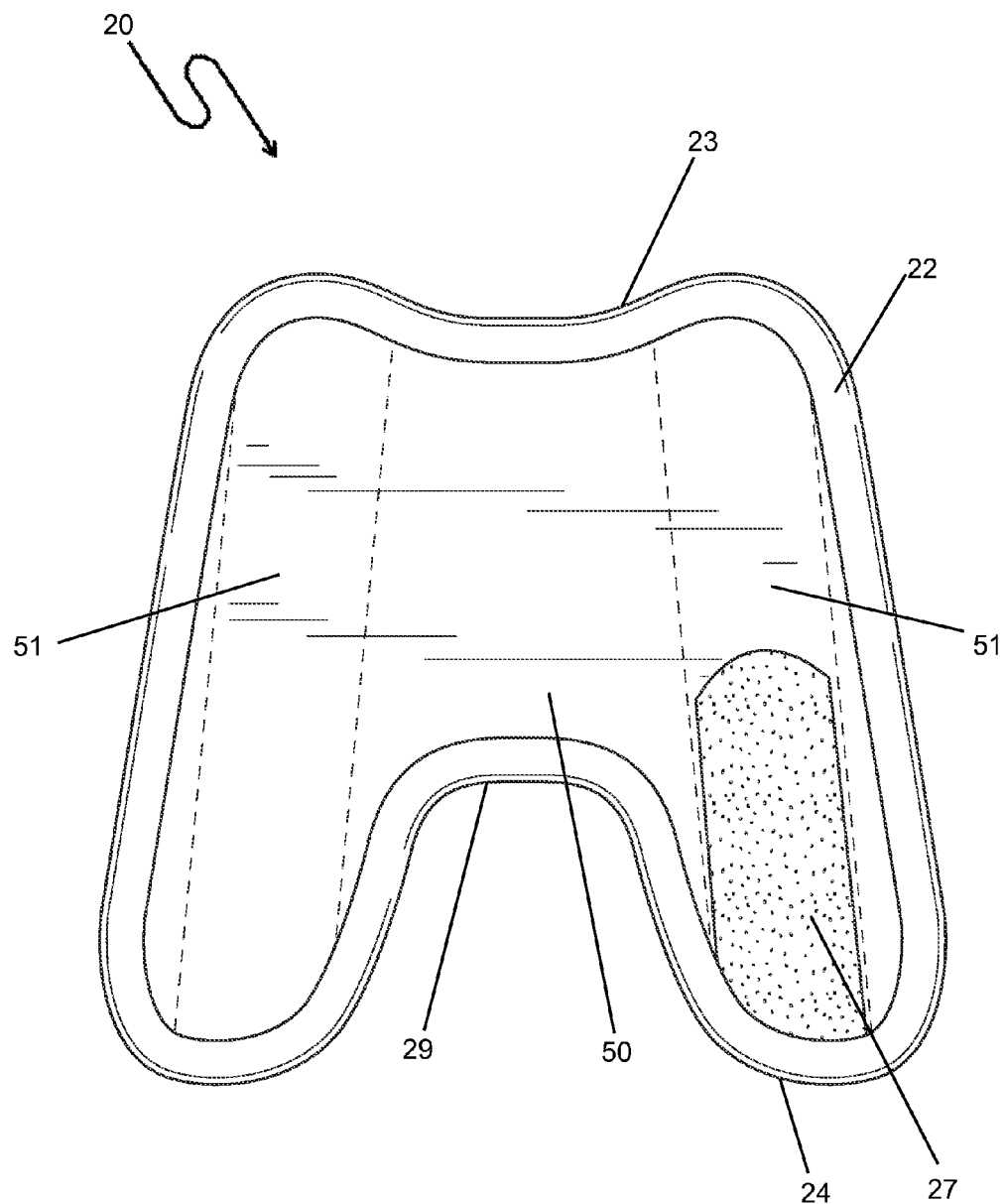
FIG. 7 is a view of the outside of a wraparound support in the open configuration, including the center portion the two side portions, one of the side portions containing a strip of one side of a hook and loop fastening device.

FIG. 7 shows a wraparound support 20 in the open configuration, the wraparound support 20 comprising an inside 21 (not shown), an outside 22, a top side 23, and a bottom side 24, said outside 22 comprising a center portion 50 and two side portions 51, one of the side portions containing a strip of one side of a hook and loop fastening device 27, and said bottom side 24 comprising a second approximately centered upside down v-shape 29.

Figure 8:
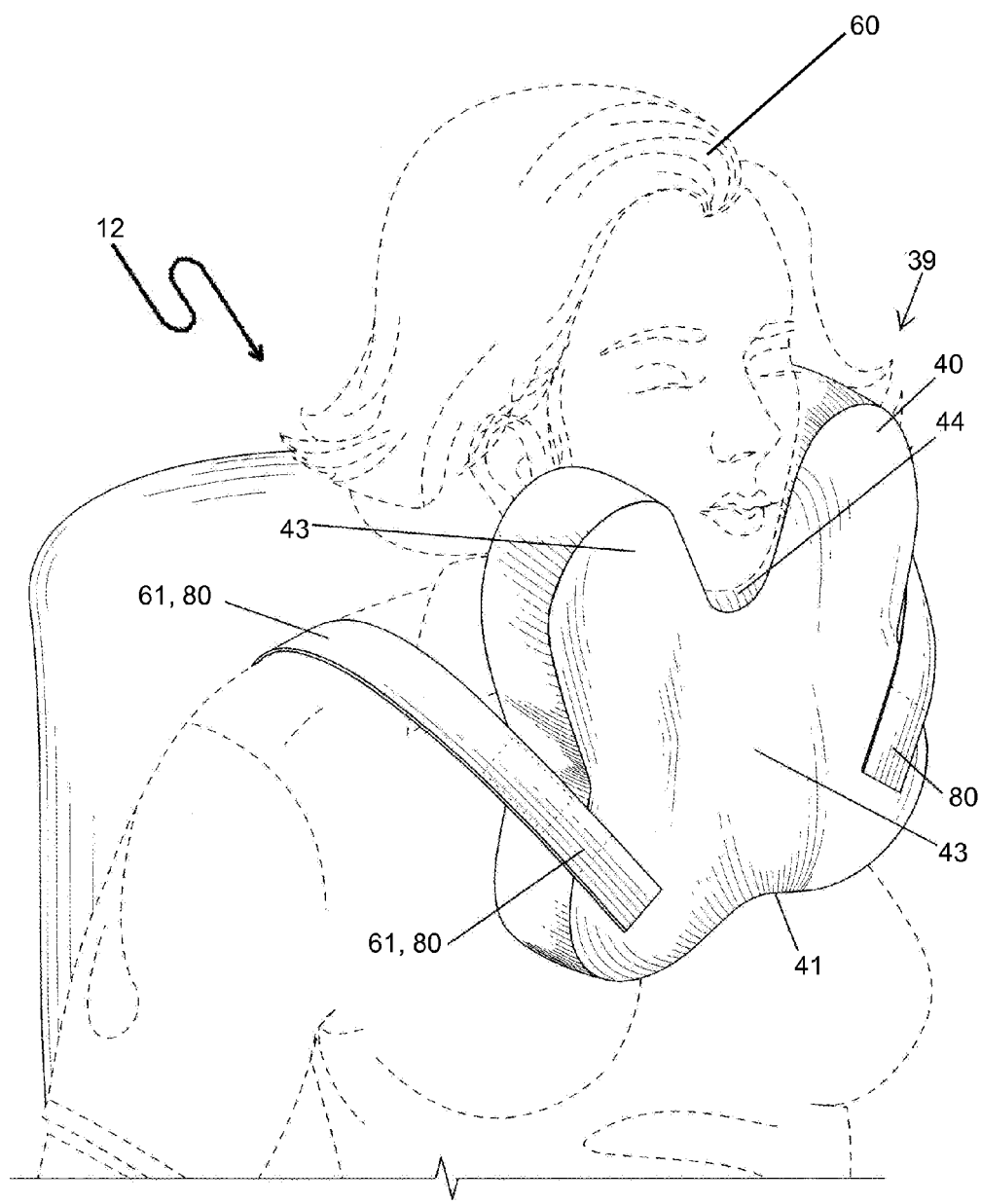
FIG. 8 is a perspective view of the portable head support device comprising the front side of the cushion whose top portion has a v-shape that can receive the chin of the user and the means for detachably fastening the cushion, which is comprised of two flexible straps extending over the shoulder of the user, each strap containing a strip of one side of a hook and loop fastening device located in a position relative to the user that the cushion's two strips of one side of a hook and loop fastening device can be detachably fastened to the straps and the user's chin can rest in the approximately centered v-shape of the top portion of the cushion.

FIG. 8 shows the portable head support device 12 comprising a cushion 39 having a top portion 40, a bottom portion 41, a front side 42 (not shown), and a back side 43, the top portion 40 having an approximately centered v-shape 44 that can receive the chin of the user 60. The means 61 shown in FIG. 8 for detachably fastening the cushion 39 to at least one support is comprised of the back side 43 of the cushion 39 having at least two strips of one side of a hook and loop fastening device 45 (not shown) and two flexible straps 80, said straps 80 extending over the shoulder of the user 60, each strap 80 containing a second strip of one side of a hook and loop fastening device 81 (not shown) located in a position relative to the user 60 that the back side 43 of the cushion's 39 at least two strips of one side of a hook and loop fastening device 45 (not shown) can be detachably fastened to the straps 80 and the user's 60 chin can rest in the approximately centered v-shape 44 of the top portion 40 of the cushion 39.

Figure 9:
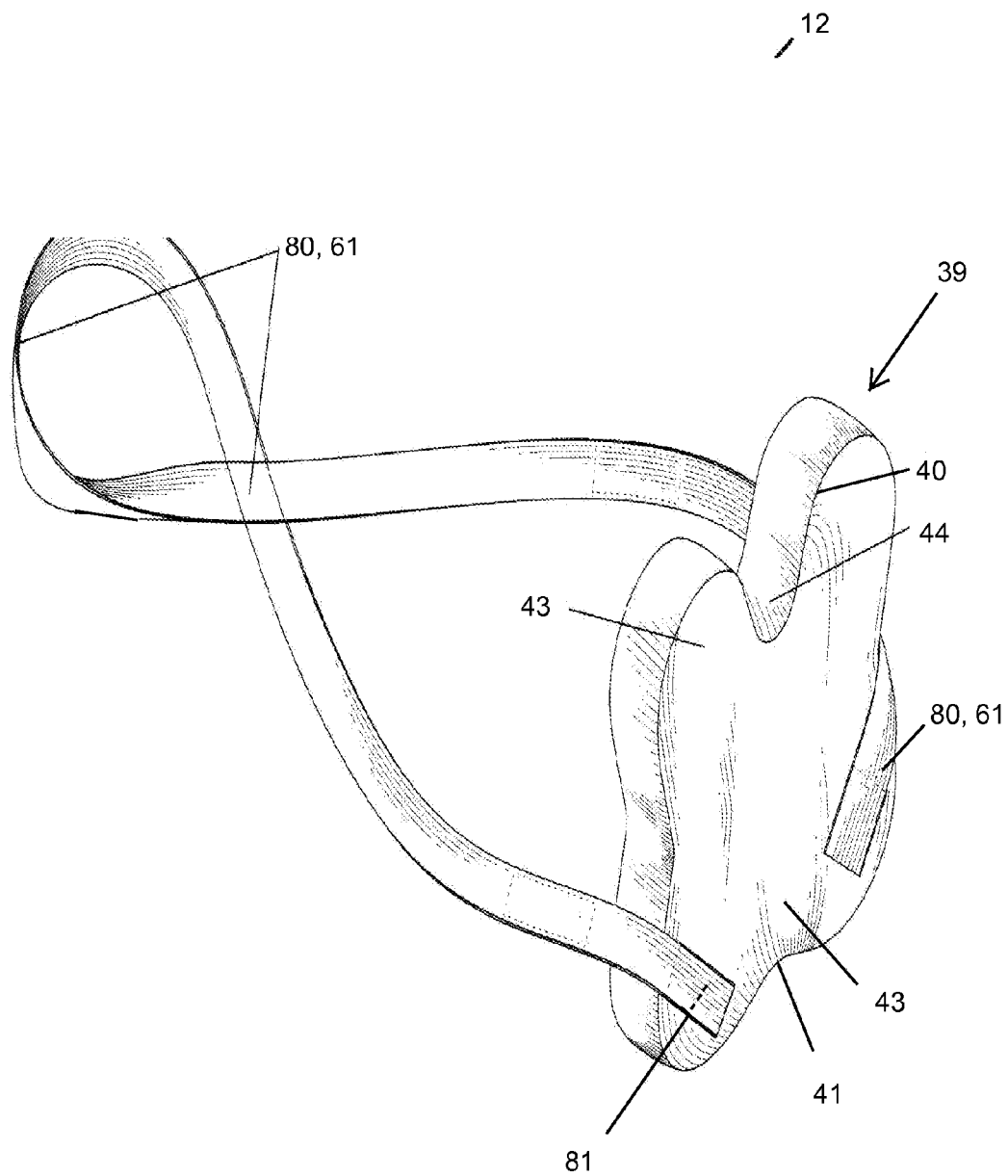
FIG. 9 is a perspective view of the portable head support device comprising the front side of the cushion and the means for detachably fastening the cushion, which is comprised of two flexible straps which are connected to each other.

FIG. 9 shows the portable head support device 12 comprising a cushion 39 having a top portion 40, a bottom portion 41, a front side 42 (not shown), and a back side 43, the top portion 40 having an approximately centered v-shape 44 that can receive the chin of a user 60 (not shown). The means 61 shown in FIG. 9 for detachably fastening the cushion 39 to at least one support is comprised of the back side 43 of the cushion 39 having at least two strips of one side of a hook and loop fastening device 45 (not shown) and two flexible straps 80 connected to each other, each strap 80 containing a second strip of one side of a hook and loop fastening device 81 (location shown by dotted line).

Figure 10:
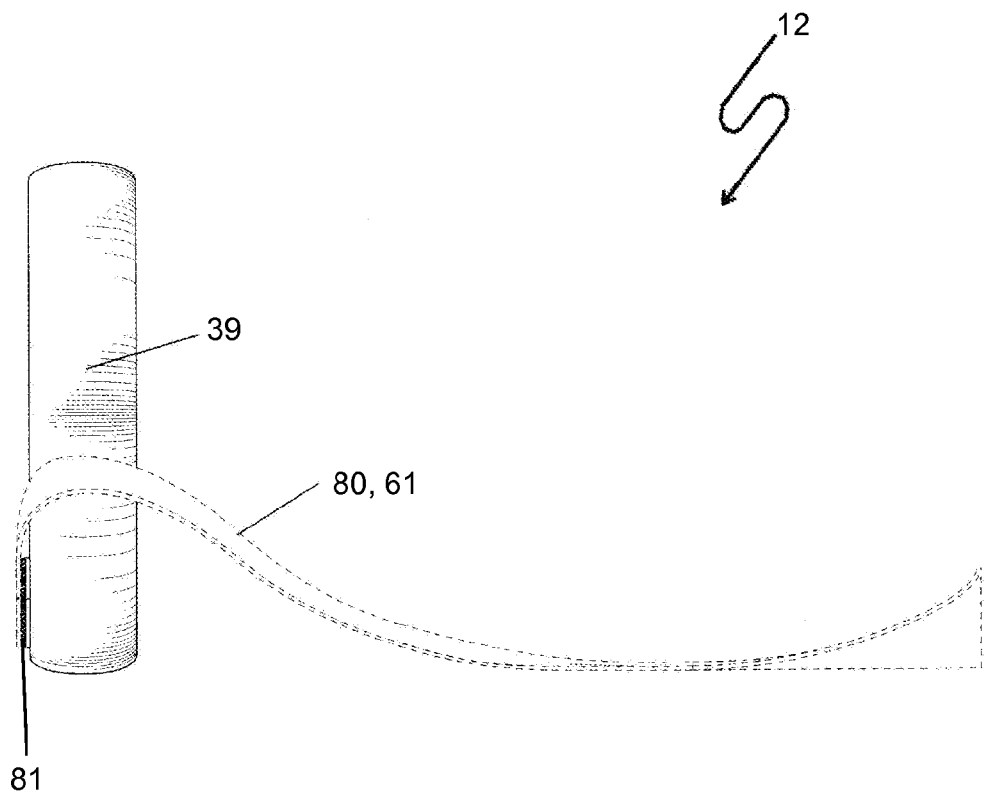
FIG. 10 is a side view of the portable head support device and the means for detachably fastening the cushion to at least one support, which is comprised of two flexible straps containing a strip of one side of a hook and loop fastening device.

FIG. 10 shows the portable head support device 12 comprising the cushion 39 and the means 61 for detachably fastening the cushion 39 to at least one support, which is comprised of two flexible straps 80, each strap 80 containing a second strip of one side of a hook and loop fastening device 81.

Figure 11:
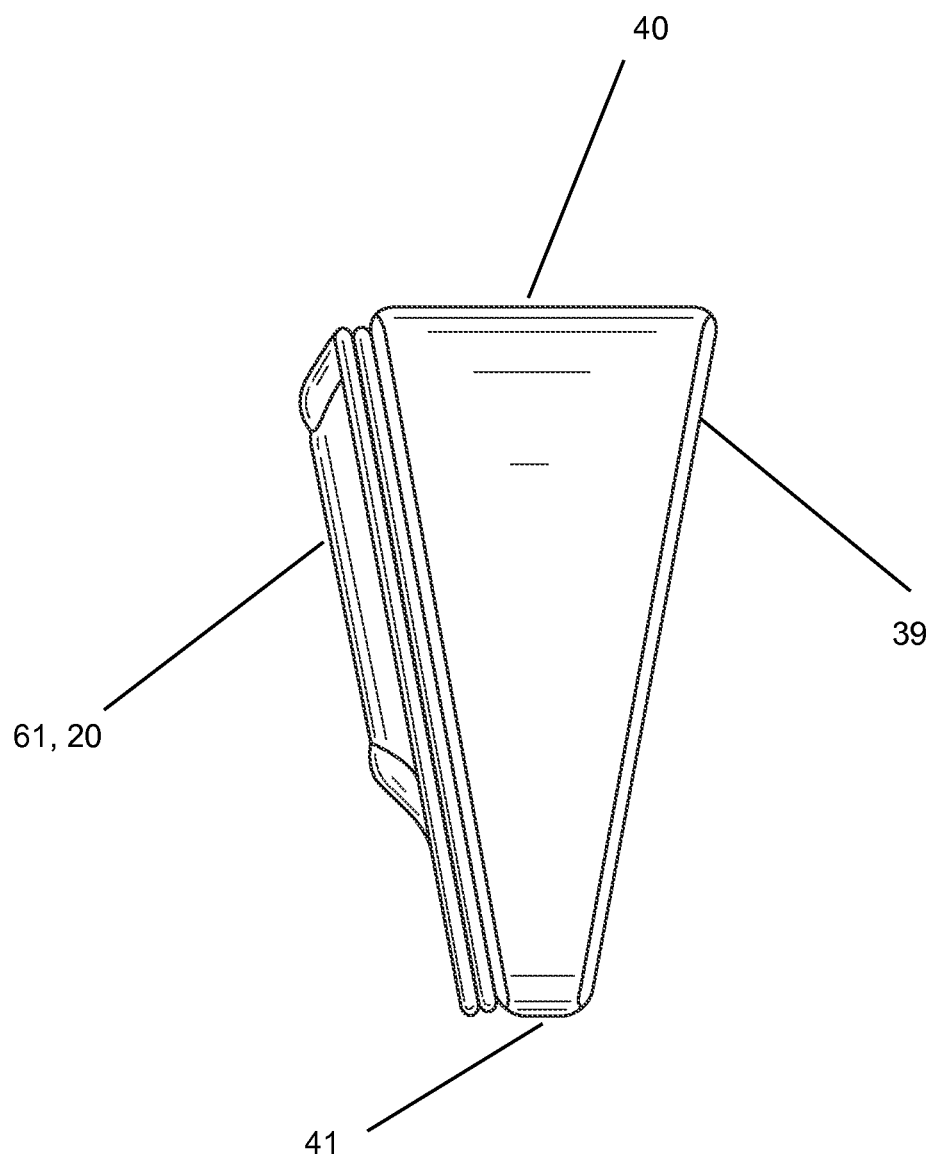
FIG. 11 is a side view of one embodiment of the invention where the top portion of the cushion is thicker than the bottom portion and the means for detachably fastening the cushion to at least one support is comprised of the two wraparound supports in the closed configuration.

FIG. 11 is a side view of one embodiment of the invention where the top portion 40 of the cushion 39 is thicker than the bottom portion 41, and the means 61 for detachably fastening the cushion 39 to at least one support is comprised of the back side 43 of the cushion 39 having at least two strips of one side of a hook and loop fastening device 45 (not shown) and the two wraparound supports 20 in the closed configuration.

As used throughout this specification and claims, certain terms have the following definitions:

A "v-shape" is not strictly confined to the shape of a "V" and is not intended to limit the object being described to a pointed shape, but rather, the shape may be in the shape of a "U" or a circle or the like, so long as the shape can hold, support or cradle the head of a user.

The term "resilient" means able to return to the original form or position after being compressed.

The term "grip-like" means a material that possesses a sufficient degree of friction that confers to the material the property of being non-slippery.

Whereas the figures and description have illustrated and described the concept and preferred embodiment of the present invention, it should be apparent to those skilled in the art that various changes may be made in the form of the invention without affecting the scope thereof. The detailed description above is not intended in any way to limit the broad features or principles of the invention, or the scope of patent monopoly to be granted.

We claim:

1. A portable head support device comprising:
   a. a cushion having a top portion, a bottom portion, a front side and a back side, the top portion having an approximately centered v-shape that can receive the chin of a user; and
   b. A means for detachably fastening the cushion to at least one support comprised of
      i. the back side of the cushion having at least two strips of one side of a hook and loop fastening device; and
      ii. two wraparound supports, each comprising:
         (1) an open configuration and a closed configuration such that:
         (2) when in the open configuration, each wraparound support comprises an inside, an outside, a top side, and a bottom side,
            (a) said inside comprising a center portion and two opposing side portions containing opposing hook and loop fastening strips, the center portion being thicker than the side portions and having a surface that is comprised of a grip-like fabric;

(b) said outside comprising a center portion and two side portions, one of the side portions containing a first strip of one side of a hook and loop fastening device, such that each wraparound support contains the strip on a different side portion; and (c) said bottom side comprising a second approximately centered upside down v-shape;

(3) when in the closed configuration, the opposing side portions containing opposing hook and loop fastening strips of the inside of the open configuration are pressed together in a detachably fastened position, thereby creating a second front side and a second back side of the closed configuration, said second front side of the closed configuration containing the first strip of one side of the hook and loop fastening device; and iii. each wraparound support being wrapped around a car seat shoulder belt and configured in the closed configuration such that the second front side's first strip of one side of a hook and loop fastening device is located in a configuration relative to the user that the cushion's at least two strips of one side of a hook and loop fastening device can be detachably fastened to the wraparound supports and the user's chin can rest in the approximately centered v-shape of the top portion of the cushion.

2. A portable head support device comprising:

a. a cushion having a top portion, a bottom portion, a front side and a back side, the top portion having an approximately centered v-shape that can receive the chin of a user; and b. A means for detachably fastening the cushion to at least one support comprised of i. the back side of the cushion having at least two strips of one side of a hook and loop fastening device; and ii. two wraparound supports, each comprising:

(1) an open configuration and a closed configuration such that:

(2) when in the open configuration, each wraparound support comprises an inside, an outside, a top side, and a bottom side, (a) said inside comprising a center portion and two opposing side portions containing opposing hook and loop fastening strips; and (b) said outside comprising a center portion and two side portions, one of the side portions containing a first strip of one side of a hook and loop fastening device, such that each wraparound support contains the strip on a different side portion;

(3) when in the closed configuration, the opposing side portions containing opposing hook and loop fastening strips of the inside of the open configuration are pressed together in a detachably fastened position, thereby creating a second front side and a second back side of the closed configuration, said second front side of the closed configuration containing the first strip of one side of the hook and loop fastening device; and iii. each wraparound support being wrapped around a car seat shoulder belt and configured in the closed configuration such that the second front side's first strip of one side of a hook and loop fastening device is located in a configuration relative to the user that the cushion's at least two strips of one side of a hook and loop fastening device can be detachably fastened to the wraparound supports and the user's chin can rest in the approximately centered v-shape of the top portion of the cushion.

\* \* \* \* \*